No. 803,738. PATENTED NOV. 7, 1905.
F. E. BAKER.
LEAD AND IRON PIPE JOINT.
APPLICATION FILED DEC. 5, 1904.

Witnesses.
R. C. Orwig.
R. H. Orwig.

Inventor: Frank E. Baker,
By Thomas G. Orwig, Attorney.

UNITED STATES PATENT OFFICE.

FRANK E. BAKER, OF OSKALOOSA, IOWA.

LEAD AND IRON PIPE JOINT.

No. 803,738.        Specification of Letters Patent.        Patented Nov. 7, 1905.

Application filed December 5, 1904. Serial No. 235,645.

*To all whom it may concern:*

Be it known that I, FRANK E. BAKER, a citizen of the United States, residing at Oskaloosa, in the county of Mahaska and State of Iowa, have invented a new and useful Lead and Iron Pipe Joint, of which the following is a specification.

My object is to save time and labor in connecting a lead pipe with a hard-metal pipe and to improve the efficiency and durability of the joint.

My invention consists in the construction, arrangement, and combination of parts, as hereinafter set forth, pointed out in my claims, and illustrated in the accompanying drawings, in which—

Figure 1:
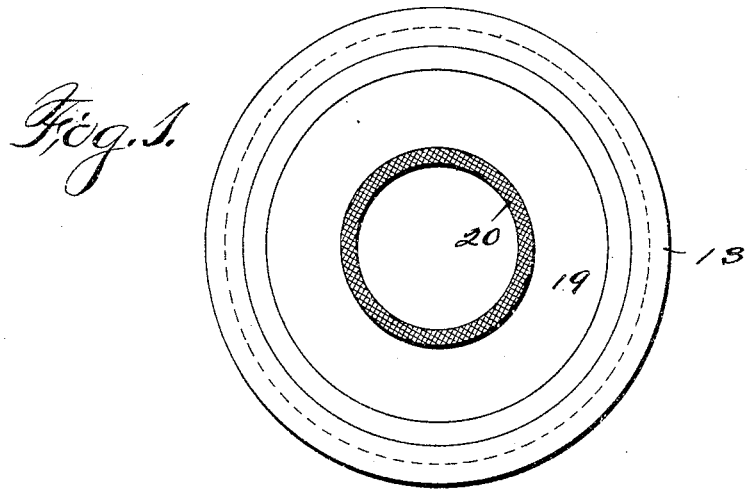
Figure 2:
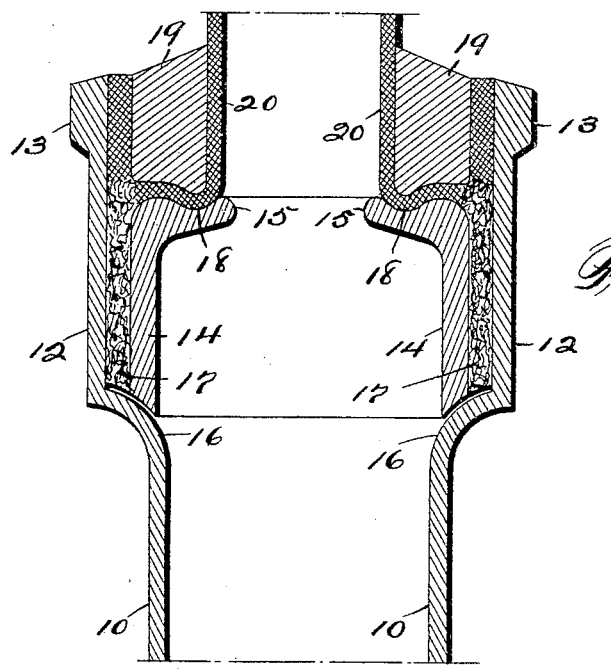

Figure 1 is the top view of the connection between a lead pipe, a metal pipe, and a metal bushing in the end of the metal pipe. Fig. 2 is a transverse central sectional view that clearly shows the positions of all the parts of the joint relative to each other, as required for advantageously connecting and sealing them together.

The numeral 10 designates a metal pipe, preferably brass, that has an enlarged diameter or end portion 12, that is provided with an annular reinforcing-swell 13 at its top.

A metal ring 14, having a flange 15 extending inward at its top, and the upper surface of the flange corrugated, concaved, or grooved, is placed in concentric position with the enlarged end portion 12 and fitted at its lower end to rest upon the base 16 of the said lower end portion to produce an annular chamber 17 between the two concentric parts, that is adapted to be filled with oakum or other suitable packing material.

The flange 15 has one or more continuous grooves 18 in its top surface, or, in other words, is practically corrugated to form a wide surface or bed adapted to aid in fastening the end of a lead pipe in the joint.

A bushing 19 in the form of a metal ring corresponding in diameter with the ring 14 is fitted to the corrugated top of the flange 15, and the annular chamber 17 is thereby extended to the top of the swell 13 on the pipe extension 12.

To produce a joint between a lead pipe 20 and the metal pipe 10, the ring 14 is placed in the extension 12 and the annular groove 17 filled with packing and the end of the lead pipe 20 stretched and placed on top of the flange 15 and the bushing 19 on the lead pipe forced down upon the inclined end of the lead pipe to clamp the lead fast between the flanged top of the ring 14 and the bottom of the bushing 19, as clearly shown in Fig. 2. By then filling the top of the annular groove with molten lead the joint is completed.

It is obvious my invention is adapted for connecting lead and metal pipe of any sizes desired and for all the various uses for which such a pipe can be utilized.

Having set forth the purpose of my invention and the construction, arrangement, and combination of the different parts, the practical utility thereof will be readily understood by plumbers and others familiar with the art to which it pertains, and

What I claim as new, and desire to secure by Letters Patent, is—

1. In a pipe-joint, a metal ring having an interior flange at its top and the top surface of the flange provided with one or more continuous concaves or grooves, a lead pipe expanded at its end and fitted on the top of said flange and a metal pipe enlarged in diameter at its end, combined as set forth, for the purposes stated.

2. In a pipe-joint, a metal pipe having an extension at its end of enlarged diameter, a metal ring having an annular flange at its top projecting inward and concaved on its top surface and a metal ring having a double curve on its bottom edge in the said extension to produce an annular chamber and the end of a lead pipe fitted in said chamber, for the purposes stated.

3. A lead and hard-metal pipe joint comprising a metal pipe having an enlarged extension at its end, a metal ring having an interior flange at its top, a metal bushing above the top of said flange, a lead pipe distended at its end and clasped fast between the metal bushing and the flange of said ring, filling in the lower part and packing in the upper part of the annular chamber produced by the enlarged extension of the metal pipe, the flanged metal ring and metal bushing, arranged and combined as and for the purposes stated.

FRANK E. BAKER.

Witnesses:
     P. M. FLAHERTY,
     GEO. E. JONES.